(12) United States Patent
Gao et al.

(10) Patent No.: US 12,530,126 B2
(45) Date of Patent: Jan. 20, 2026

(54) DATA PROCESSING METHOD AND RELATED APPARATUS

(71) Applicant: Huawei Technologies Co., Ltd., Shenzhen (CN)

(72) Inventors: Yuan Gao, Xi'an (CN); Qiang Xue, Chengdu (CN); Jinkang Wu, Abu Dhabi (AE); Zhenbo Zhang, Xi'an (CN); Jianqiang Shen, Hangzhou (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 18/647,440

(22) Filed: Apr. 26, 2024

(65) Prior Publication Data
US 2024/0295966 A1 Sep. 5, 2024

Related U.S. Application Data

(63) Continuation of application No. PCT/CN2022/091640, filed on May 9, 2022.

(30) Foreign Application Priority Data

Oct. 29, 2021 (CN) .......................... 202111277293.4

(51) Int. Cl.
G06F 3/06 (2006.01)
G06F 12/1009 (2016.01)

(52) U.S. Cl.
CPC .......... *G06F 3/0613* (2013.01); *G06F 3/0659* (2013.01); *G06F 3/0673* (2013.01); *G06F 12/1009* (2013.01)

(58) Field of Classification Search
CPC .... G06F 11/14; G06F 12/1009; G06F 3/0608; G06F 3/0613; G06F 3/0641; G06F 3/0659; G06F 3/0673
See application file for complete search history.

(56) References Cited

U.S. PATENT DOCUMENTS

| | | |
|---|---|---|
| 6,928,526 B1 | 8/2005 | Zhu et al. |
| 7,065,619 B1 | 6/2006 | Zhu et al. |
| 7,599,932 B2 | 10/2009 | Patterson |
| 2018/0267896 A1 | 9/2018 | Zhang et al. |
| 2021/0271644 A1 | 9/2021 | Chinthekindi |

*Primary Examiner* — Yong J Choe
(74) *Attorney, Agent, or Firm* — Conley Rose, P.C.

(57) ABSTRACT

A task processing method comprising obtaining a first identifier (ID) sequence from a logical unit number (LUN) mapping table based on logical addresses of first data, where IDs in the first ID sequence are allocated based on a sequence of physical addresses, where the LUN mapping table includes mapping relationships between the logical addresses and the IDs; obtaining first physical addresses from an ID mapping table based on one ID in the first ID sequence when the IDs in the first ID sequence are consecutive, where the ID mapping table includes a mapping relationship between an ID and a physical address and the first physical addresses are a plurality of physical addresses corresponding to the first ID sequence; and reading the first data based on the first physical addresses.

20 Claims, 7 Drawing Sheets

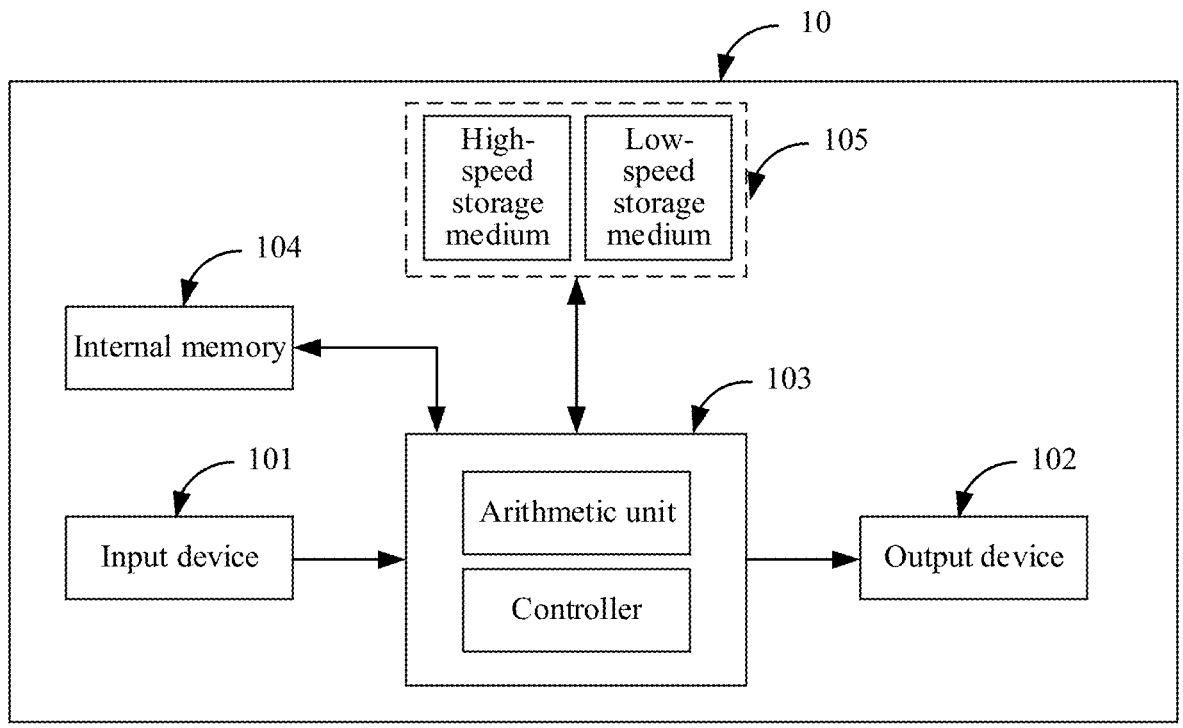

FIG. 1

201: Obtain a first ID sequence from a LUN mapping table based on logical addresses of first data, where IDs in the first ID sequence are allocated based on a sequence of physical addresses, and the first data is a plurality of pieces of data with consecutive IDs 202: Obtain first physical addresses from an ID mapping table based on one ID in a first ID sequence, where the first physical addresses are a plurality of physical addresses corresponding to the first ID sequence 203: Read the first data based on the first physical addresses

FIG. 2A

DATA PROCESSING METHOD AND RELATED APPARATUS

CROSS-REFERENCE TO RELATED APPLICATIONS

This is a continuation application of International Patent Application PCT/CN2022/091640, filed on May 9, 2022, which claims priority to Chinese Patent Application No. 202111277293.4, filed on Oct. 29, 2021. The disclosures of the aforementioned applications are hereby incorporated by reference in their entireties.

TECHNICAL FIELD

Embodiments of this application relate to the storage field, and in particular, to a data processing method and a related apparatus.

BACKGROUND

In an existing data backup scenario, after a computer device receives input data, the computer device generates a unique fingerprint of the data, and performs duplication check in a fingerprint table based on the generated fingerprint. The fingerprint table includes a mapping relationship between a fingerprint and a physical address. When the calculated fingerprint does not duplicate a fingerprint in the fingerprint table, the computer device allocates a mapping relationship between the fingerprint and a physical address in the fingerprint table, and the data corresponding to the fingerprint is stored in the allocated physical address.

When the computer device restores backup data, the computer device reads data based on a logical address sequence. Because the data is stored based on fingerprints when the data is written, in a data reading process, the computer device needs to search the fingerprint table based on the fingerprints of the data to obtain a physical address. However, because the fingerprints are not consecutive, the computer device needs to search the fingerprint table for each fingerprint in a data restoration process. Therefore, the fingerprint table is searched a plurality of times. As a result, a reading speed in the data restoration process is low.

SUMMARY

Embodiments of this application provide a data processing method and a related apparatus, to improve a data reading speed.

A first aspect of embodiments of this application provides a data processing method. The method is performed by a computer device, or may be performed by a component of the computer device, for example, a processor, a chip, or a chip system of the computer device, or may be performed by a logical module or software that can implement all or some functions of the computer device. The computer device is used as an example. The method provided in the first aspect includes a computer device that obtains a first identifier (ID) sequence from a logical unit number (LUN) mapping table based on logical addresses of first data, where IDs in the first ID sequence are allocated based on a sequence of physical addresses, the first data is a plurality of pieces of data with consecutive IDs, and the LUN mapping table includes mapping relationships between the logical addresses and the IDs. When the IDs in the first ID sequence are consecutive, the computer device obtains first physical addresses from an ID mapping table based on one ID in the first ID sequence, where the ID may be the first ID in the consecutive IDs, the ID mapping table includes a mapping relationship between an ID and a physical address, and the first physical addresses are a plurality of physical addresses corresponding to the first ID sequence. The computer device reads the first data based on the first physical addresses.

An embodiment of this application provides a backup storage index structure, that is, a LUN mapping table and an ID mapping table. The LUN mapping table includes a mapping relationship between a logical address and an ID sequence. The ID mapping table includes a mapping relationship between an ID sequence and a physical address. Because a physical address allocation sequence is consistent with an ID sequence allocation sequence, and an ID sequence is continuous, when reading data with a continuous ID sequence, the computer device can obtain consecutive physical addresses in batches while the computer device only needs to search for one ID in the ID sequence. Repeated table search is not needed, thereby improving a data reading speed.

Based on the first aspect, in a possible implementation, the computer device receives second data, where the second data is data to be stored in batches by the computer device. The computer device generates fingerprints of the second data, and performs duplication check based on the fingerprints of the second data. When the fingerprints of the second data do not duplicate fingerprints in the FP mapping table, the computer device allocates consecutive second IDs and consecutive second physical addresses to the second data, where the FP mapping table includes a mapping relationship between a fingerprint and an ID.

In an embodiment of this application, in a data writing process of the computer device, when fingerprints of written data do not duplicate the fingerprints in the fingerprint mapping table, the computer device allocates consecutive IDs and consecutive physical addresses to the fingerprints of the data. Because an allocation sequence of the IDs is consistent with that of the physical addresses, the computer device can read the physical addresses of the data in batches based on continuity of the IDs in a data reading process. In this case, the fingerprint mapping table can be less frequently searched, and data reading performance is improved.

Based on the first aspect, in a possible implementation, when the fingerprints of the second data duplicate the fingerprints in the FP mapping table, and the fingerprints of the second data do not duplicate fingerprints in the ID mapping table, the computer device allocates the second IDs and the second physical addresses to the second data.

Based on the first aspect, in a possible implementation, the fingerprint in the FP mapping table is a part fingerprint of a complete fingerprint, and the fingerprint in the ID mapping table is a complete fingerprint.

In an embodiment of this application, when the computer device performs duplication check on fingerprints of data, the computer device preferentially searches for part fingerprints in the FP mapping table. When the fingerprints of the data duplicate the part fingerprints in the FP mapping table, the computer device continues to search for the complete fingerprints in the ID mapping table. In an embodiment of this application, the computer device preferentially searches for the part fingerprints. In this way, efficiency of duplication check of the computer device is improved.

Based on the first aspect, in a possible implementation, after the computer device allocates the consecutive second IDs and the consecutive second physical addresses to the second data, the computer device stores the second data to the second physical addresses. The computer device adds mapping relationships between the second IDs, the fingerprints of the second data, and the second physical addresses to the ID mapping table. The computer device adds mapping relationships between part fingerprints of the second data and the second IDs to the FP mapping table.

In an embodiment of this application, after allocating the consecutive IDs and the consecutive physical addresses to the non-duplicated data, the computer device updates the LUN mapping table, the ID mapping table, and the FP mapping table. This improves accuracy of subsequent duplication check by the computer device.

Based on the first aspect, in a possible implementation, after performing duplication check in the FP mapping table based on the part fingerprint of the second data, when the part fingerprint of the second data duplicates the fingerprint in the FP mapping table, the computer device loads, to an internal memory, entries corresponding to a plurality of IDs near an ID corresponding to the duplicated fingerprint in the FP mapping table.

In an embodiment of this application, after the computer device performs duplication check in the FP mapping table, if a fingerprint duplicates a fingerprint in the FP mapping table, the computer device loads, to the internal memory, ID entries that are mapped to fingerprints and that are near an ID corresponding to the duplicated fingerprint. Because duplicates of written data are usually consecutive, efficiency of duplication check of the computer device is further improved when the computer device loads, to the internal memory, the near ID entries mapped to the fingerprints.

Based on the first aspect, in a possible implementation, some IDs are reserved in ID segments for data of different attributes in the ID mapping table, so that IDs allocated to data that is of a same attribute and that is input discontinuously are consecutive.

In an embodiment of this application, the computer device reserves an ID allocation space for data of a same attribute. In this way, allocation for the data of the same attribute is consecutive, and then the computer device can obtain physical addresses in batches based on continuity of IDs in the data reading process. This improves a data reading speed.

Based on the first aspect, in a possible implementation, when an ID in the LUN mapping table is overwritten, the computer device deletes the ID that does not exist in the LUN mapping table from the ID mapping table. In an example, the computer device triggers ID recycling when a system is idle, or ID recycling is periodically triggered. The computer device scans all IDs that have a mapping relationship in the LUN mapping table, scans the IDs in the ID mapping table, and deletes an ID entry that exists only in the ID mapping table but does not exist in the LUN mapping table.

In an embodiment of this application, when overwriting occurs on the computer device, that is, when an ID in the LUN mapping table is overwritten and the overwritten ID is not duplicated, the computer device deletes an ID entry that exists in the ID mapping table but does not exist in the LUN mapping table. In this way, space utilization of the ID mapping table is improved.

Based on the first aspect, in a possible implementation, an ID set of the LUN mapping table may be implemented by using a bloom filter. The computer device searches the bloom filter for an ID in the ID mapping table. If the ID does not exist in the bloom filter, the computer device deletes an entry of the ID from the ID mapping table. Further, the computer device may change a hash function when searching the bloom filter for the ID in the ID mapping table.

In an embodiment of this application, the ID set of the LUN mapping table may be implemented by using the bloom filter, to improve space utilization of the LUN mapping table. In addition, by changing the hash function during ID recycling, bloom filter misjudgment caused by a hash conflict can be avoided, so that a situation in which it is determined that an ID exists while the ID actually does not exist can be avoided. This improves scanning efficiency in ID recycling.

Based on the first aspect, in a possible implementation, for each time of ID recycling, an ID range may be limited, and an ID recycling task may be segmented, to prevent excessive ID recycling, which affects service reading and writing.

A second aspect of embodiments of this application provides a data processing apparatus. The data processing apparatus includes an interface unit and a processing unit. The processing unit is configured to obtain a first identifier ID sequence from a logical unit number LUN mapping table based on logical addresses of first data, where IDs in the first ID sequence are allocated based on a sequence of physical addresses, the first data is a plurality of pieces of data with consecutive IDs, and the LUN mapping table includes mapping relationships between the logical addresses and the IDs. When the IDs in the first ID sequence are consecutive, the processing unit is further configured to obtain first physical addresses from an ID mapping table based on one ID in the first ID sequence, where the ID mapping table includes a mapping relationship between an ID and a physical address, and the first physical addresses are a plurality of physical addresses corresponding to the first ID sequence. The processing unit is further configured to read the first data based on the first physical addresses.

Based on the second aspect, in a possible implementation, the interface unit is configured to receive second data, where the second data is data to be stored in batches by the data processing apparatus. When fingerprints of the second data do not duplicate fingerprints in the FP mapping table, the processing unit is further configured to allocate consecutive second IDs and consecutive second physical addresses to the second data, where the FP mapping table includes a mapping relationship between a fingerprint and an ID.

Based on the second aspect, in a possible implementation, the processing unit is further configured to, when the fingerprints of the second data duplicate the fingerprints in the FP mapping table, and the fingerprints of the second data do not duplicate fingerprints in the ID mapping table, allocate the second IDs and the second physical addresses to the second data.

Based on the second aspect, in a possible implementation, the fingerprint in the FP mapping table is a part fingerprint of a complete fingerprint, and the fingerprint in the ID mapping table is a complete fingerprint.

Based on the second aspect, in a possible implementation, the processing unit is further configured to store the second data in the second physical addresses, add mapping relationships between the second IDs, the fingerprints of the second data, and the second physical addresses to the ID mapping table, and add mapping relationships between part fingerprints of the second data and the second IDs to the FP mapping table.

Based on the second aspect, in a possible implementation, the processing unit is further configured to, when the part fingerprint of the second data duplicates the fingerprint in the FP mapping table, load, to an internal memory, entries corresponding to a plurality of IDs near an ID corresponding to the duplicated fingerprint in the FP mapping table.

Based on the second aspect, in a possible implementation, some IDs are reserved in ID segments for data of different attributes in the ID mapping table, so that IDs allocated to data that is of a same attribute and that is input discontinuously are consecutive.

Based on the second aspect, in a possible implementation, the processing unit is further configured to, when an ID in the LUN mapping table is overwritten, the processing unit deletes the ID that does not exist in the LUN mapping table from the ID mapping table.

A third aspect of embodiments of this application provides a computer device including a processor, where the processor is coupled to a memory. The processor is configured to store instructions. When the instructions are executed by the processor, the computer device is enabled to perform the method according to any one of the first aspect or the possible implementations of the first aspect.

A fourth aspect of embodiments of this application provides a computer-readable storage medium. The computer-readable storage medium stores instructions. When the instructions are executed, a computer is enabled to perform the method according to any one of the first aspect or the possible implementations of the first aspect.

A fifth aspect of embodiments of this application provides a computer program product. The computer program product includes instructions. When the instructions are executed, a computer is enabled to perform the method according to any one of the first aspect or the possible implementations of the first aspect.

It may be understood that, for beneficial effects that can be achieved by any data processing apparatus, computer device, computer-readable medium, computer program product, or the like provided above, reference can be made to beneficial effects in a corresponding method. Details are not described herein again.

BRIEF DESCRIPTION OF DRAWINGS

FIG. 1 is a schematic diagram of a storage system architecture according to an embodiment of this application;

FIG. 2A is a schematic diagram of a data processing method according to an embodiment of this application;

DESCRIPTION OF EMBODIMENTS

Figure 2B:
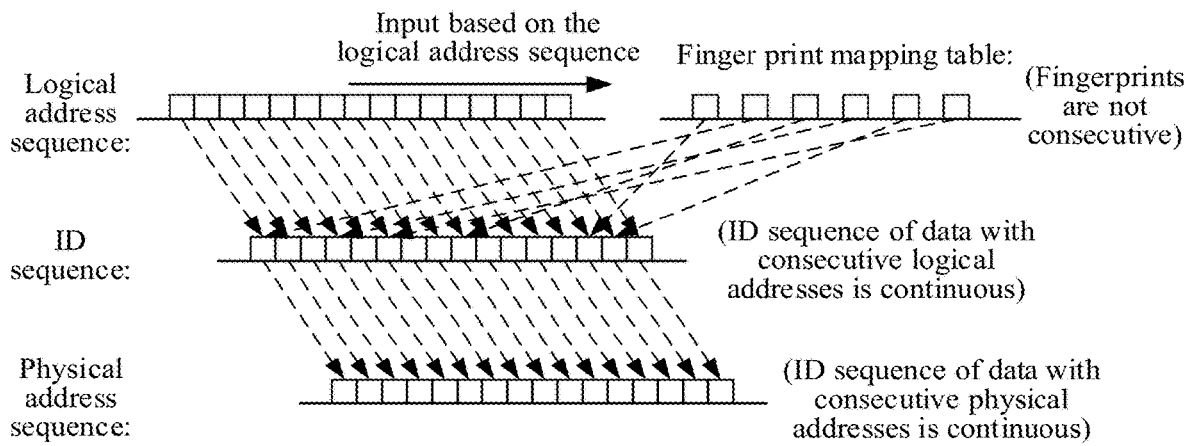
FIG. 2B is a schematic diagram of an index structure according to an embodiment of this application.

Embodiments of this application provide a data processing method and a related apparatus, to improve a data read speed.

In the specification, claims, and accompanying drawings of this application, the terms "first", "second", "third", "fourth", and the like (if existent) are intended to distinguish between similar objects but do not necessarily indicate a specific order or sequence. It should be understood that the data termed in such a way are interchangeable in proper circumstances so that embodiments described herein can be implemented in another order than the order illustrated or described herein. In addition, the terms "include" and "have" and any variant thereof are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

In addition, in embodiments of this application, words such as "example" and "for example" are used to give an example, an illustration, or a description. Any embodiment or design scheme described as an "example" or "for example" in embodiments of this application should not be explained as being more preferred or having more advantages than another embodiment or design scheme. Exactly, use of the words such as "example", "for example", or the like is intended to present a related concept in a specific manner.

Some terms in this application are described below to help a person skilled in the art have a better understanding.

Logical block address (LBA) is a general mechanism for describing a block where data is located on a computer storage device. The logical block address may be an address of a data block or a data block to which an address points. A so-called logical block on a computer device is usually a 512-bit or 1024-bit group.

A physical block address (PBA) is an address of a physical disk block. A physical block address indicates a physical location on a storage medium.

A fingerprint (FP) is also referred to as a deduplication fingerprint. Deduplication is calculating a hash value of a part of data in a data set by using an algorithm. The hash value is used as a unique identifier of the part of data, and the unique identifier is a fingerprint. When fingerprints of two parts of data are the same, a computer device considers that the two parts of data are consistent.

Garbage collection (GC) is an automatic memory management mechanism. When a dynamic memory on a computer device is no longer required, the memory should be released to free up the memory. Such memory resource management is referred to as garbage collection.

The following describes, with reference to accompanying drawings, a data processing method and a related apparatus provided in embodiments of this application.

Referring to FIG. 1, a schematic diagram of a structure of a storage system according to an embodiment of this application is disclosed. As shown in FIG. 1, a storage system 10 includes an input device 101, an output device 102, a central processing unit 103, an internal memory 104, and an external memory 105. The central processing unit 103 includes a controller and an arithmetic unit. The central processing unit 103 is separately connected to the internal memory 104 and the external memory 105.

The external memory 105 includes a high-speed storage medium and a low-speed storage medium. The high-speed storage medium is, for example, a solid state drive (SSD), and the low-speed storage medium is, for example, a hard disk drive (HDD).

The storage system 10 provided in an embodiment of this application may be applied to a computer device. The following uses the computer device as an example to describe a data processing method provided in embodiments of this application. The data processing method in embodiments of this application may be applied to a data backup and restoration scenario, including a data writing process and a data reading process. The following describes a data writing process and a data reading process.

Referring to FIG. 2A, a schematic flowchart of a method for a data reading process according to an embodiment of this application is disclosed. The method is performed by a computer device, or may be performed by a component of the computer device, or may be implemented by a logical module or software that can implement all or some functions of the computer device. A procedure of a data processing method shown in FIG. 2A includes the following steps.

201: A computer device obtains a first ID sequence from a LUN mapping table based on logical addresses of first data, where IDs in the first ID sequence are allocated based on physical addresses, and the first data is a plurality of pieces of data with consecutive IDs.

In an embodiment of this application, the computer device obtains the first ID sequence from the LUN mapping table based on the logical addresses of the first data. The first data is a plurality of pieces of data with consecutive IDs in the LUN mapping table. The LUN mapping table includes a mapping relationship between a logical address and an ID. Because the IDs in the first ID sequence are allocated by the computer device based on a sequence of the physical addresses, a sequence of the IDs is consistent with the sequence of the physical addresses. A continuous ID sequence corresponds to consecutive physical addresses. A process of allocating the IDs is described in an embodiment of a data writing process.

The data reading process in an embodiment of this application is performed based on an index structure of a storage system. The following describes the index structure in an embodiment of this application. The index structure includes a logical unit number LUN mapping table, an identifier ID mapping table, and a fingerprint FP mapping table. The LUN mapping table includes a mapping relationship between a logical address and an ID. The ID mapping table includes a mapping relationship between an ID, a complete fingerprint, and a physical address. The FP mapping table includes a mapping relationship between a part fingerprint and an ID.

Referring to FIG. 2B, a schematic diagram of an index structure according to an embodiment of this application is disclosed. As shown in FIG. 2B, a LUN mapping table indicates a mapping relationship between a logical address sequence and an ID sequence of data. It can be seen from FIG. 2B that, after a computer device writes data based on the logical address sequence, an ID sequence corresponding to data with consecutive logical addresses is also continuous. The data corresponding to the logical address sequence shown in FIG. 2B is non-deduplication data. It may be understood that when data with consecutive logical addresses is deduplication data, an ID sequence corresponding to the logical addresses is duplicated and continuous.

In an example shown in FIG. 2B, an ID mapping table may indicate a mapping relationship between an ID sequence and a physical address sequence. It can be learned from FIG. 2B that a continuous ID sequence corresponds to consecutive physical addresses. Each ID in the ID mapping table is unique, and each ID corresponds to one physical address. Therefore, when the computer data device reads data of the physical addresses, the computer data device may obtain the consecutive physical addresses in batches by searching the ID mapping table once due to ID continuity. In the example shown in FIG. 2B, the FP mapping table indicates a mapping relationship between a fingerprint and an ID. It can be learned from FIG. 2B that because fingerprints are not consecutive, the computer device cannot obtain an ID sequence in batches based on the fingerprints.

The following describes, with reference to specific examples, a LUN mapping table, an identifier ID mapping table, and a fingerprint FP mapping table provided in embodiments of this application.

Referring to Table 1, a logical unit number LUN mapping table according to an embodiment of this application is disclosed. As shown in Table 1, the LUN mapping table includes mapping relationships between logical addresses and IDs of data. For example, an ID corresponding to a logical address "0x756FCD20" is "1", and an ID corresponding to a logical address "0x756FCD30" is 2. In a scenario of data backup and restoration, a duplicated ID sequence in the LUN mapping table is usually a plurality of consecutive IDs. For example, an ID sequence corresponding to a data segment with logical addresses from 0x756FCD20 to 0x756FCD60 is 1 to 5, and an ID sequence corresponding to a data segment with logical addresses from 0x756FCD70 to 0x756FCD90 is 2 to 4.

TABLE 1

| LUN mapping table | |
|---|---|
| Logical address LBA | ID |
| 0x756FCD20 | 1 |
| 0x756FCD30 | 2 |
| 0x756FCD40 | 3 |
| 0x756FCD50 | 4 |
| 0x756FCD60 | 5 |
| ... | ... |

Referring to Table 2, an identifier ID mapping table according to an embodiment of this application is disclosed. As shown in Table 2, the ID mapping table includes a mapping relationship between an ID, a complete fingerprint, and a physical address of data. For example, data whose ID is "1" corresponds to a fingerprint "1564898754145" and a physical address "0x1FFF2000", and data whose ID is "2" corresponds to a fingerprint "4565131564545" and a physical address "0x1FFF2020". Because a sequence of IDs in the ID mapping table is allocated based on a sequence of physical addresses, consecutive IDs correspond to consecutive physical addresses.

TABLE 2

| ID mapping table | | |
|---|---|---|
| ID | Fingerprint FP | Physical address PBA |
| 1 | 1564898754145 | 0x1FFF2000 |
| 2 | 4565131564545 | 0x1FFF2020 |
| 3 | 4512156552156 | 0x1FFF2040 |
| 4 | 8956494887165 | 0x1FFF2060 |
| 5 | 1566456116232 | 0x1FFF2080 |
| ... | ... | ... |

Referring to Table 3, a fingerprint mapping table according to an embodiment of this application is disclosed. As shown in Table 3, the FP mapping table includes a mapping relationship between a part fingerprint and an ID of data. For example, an ID corresponding to data with a part fingerprint "156489875" is 1, and an ID corresponding to data with a part fingerprint "456513156" is 2. It can be learned from the FP mapping table that a fingerprint sequence layout is discontinuous. Therefore, a computer device cannot search the physical address mapping table by performing fingerprint search once based on a fingerprint, to obtain physical addresses corresponding to fingerprints in batches.

TABLE 3

FP mapping table

| Part fingerprint part_FP | ID |
|---|---|
| 156489875 | 1 |
| 456513156 | 2 |
| 451215655 | 3 |
| 895649488 | 4 |
| 156645611 | 5 |
| ... | ... |

202: The computer device obtains first physical addresses from the ID mapping table based on one ID in the first ID sequence, where the first physical addresses are a plurality of physical addresses corresponding to the first ID sequence.

After the computer device obtains the first ID sequence based on the logical addresses of the first data, the computer device obtains the first physical addresses from the ID mapping table in batches based on one ID in the first ID sequence, where the first physical addresses are a plurality of physical addresses corresponding to the first ID sequence. In a process of obtaining the first physical addresses, it may be understood that the computer device needs to search the ID mapping table only once, to obtain a batch of consecutive first physical addresses based on continuity of the physical addresses and the ID sequence.

In a scenario of data backup and restoration, a duplicated ID sequence in the LUN mapping table is usually a plurality of consecutive IDs, and an ID sequence in the ID mapping table is allocated based on a physical address sequence. In an example, in a data reading process, the computer device may search for a physical address in the ID mapping table based on one ID in a continuous ID sequence, and obtain, based on continuity of the IDs, a plurality of physical addresses in batches by searching the table once, to read data stored in the plurality of physical addresses.

203: The computer device reads the first data based on the first physical addresses.

After the computer device obtains the first physical addresses from the ID mapping table based on one ID in the first ID sequence, the computer device reads the first data in batches based on the first physical addresses.

An embodiment of this application provides the index structure of the storage system. Based on the storage index structure, a physical address allocation sequence is consistent with an ID sequence allocation sequence, where the ID sequence is continuous. In an example, when reading data with a continuous ID sequence, the computer device can obtain consecutive physical addresses in batches while the computer device needs to search for only one ID in the ID sequence. Repeated table search is not needed. In this way, a data reading speed is improved.

Figure 3:
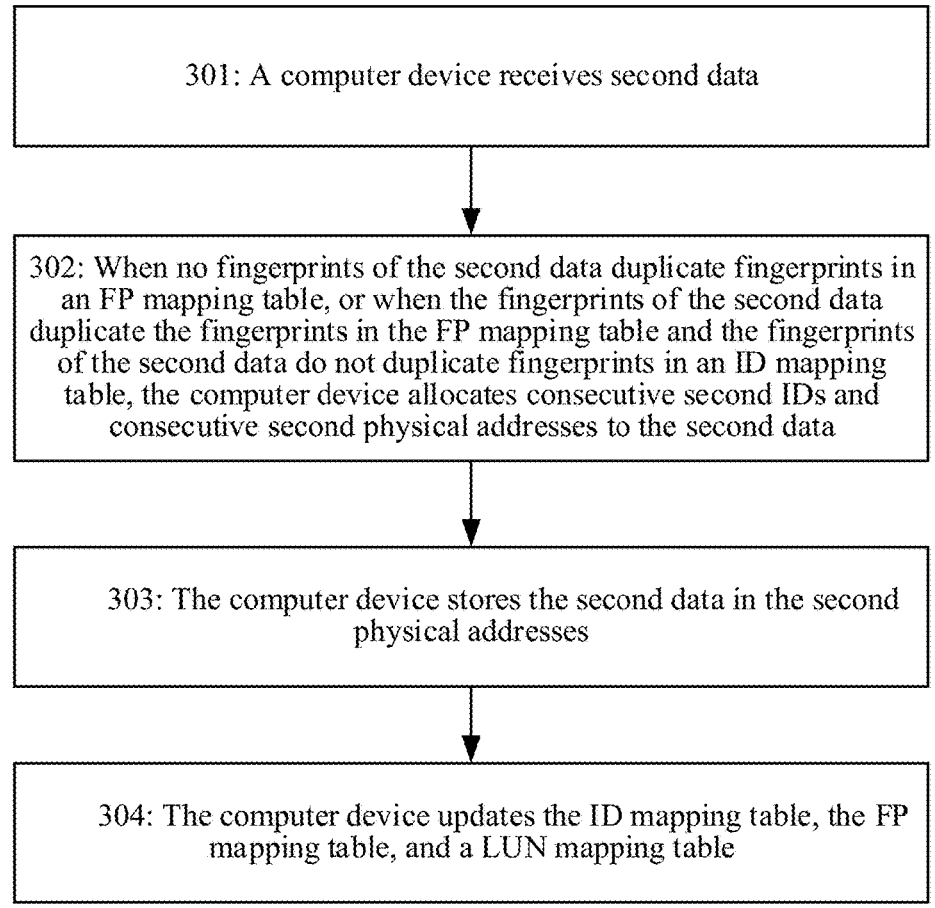
FIG. 3 is a schematic diagram of another data processing method according to an embodiment of this application.

With reference to FIG. 3, the following describes an ID sequence allocation process in a data writing process according to an embodiment of this application.

Referring to FIG. 3, a schematic flowchart of a data writing process according to an embodiment of this application is disclosed. The method is performed by a computer device, or may be performed by a component of the computer device, or may be implemented by a logical module or software that can implement all or some functions of a server. A procedure of a data processing method shown in FIG. 3 includes the following steps.

301: The computer device receives second data.

In an embodiment of this application, in a data writing process of the computer device, the computer device receives the written second data, where the second data is data to be stored in batches by the computer device. After receiving the second data, the computer device divides the second data into blocks, and then generates a fingerprint of each data block in the second data.

The second data in the embodiment of the data writing process in this application and the first data in the embodiment of the data reading process may be same data, or may be different data. This is not limited.

In an embodiment of this application, after the computer device generates the fingerprint of each data block in the second data, the computer device performs duplication check in an FP mapping table and an ID mapping table based on fingerprints of the second data.

302: When no fingerprints of the second data duplicate fingerprints in the FP mapping table, or when the fingerprints of the second data duplicate the fingerprints in the FP mapping table and the fingerprints of the second data do not duplicate fingerprints in the ID mapping table, the computer device allocates consecutive second IDs and consecutive second physical addresses to the second data.

When the computer device performs duplication check based on the fingerprints of the second data, the computer device searches the FP mapping table for the fingerprints of the second data, where the FP mapping table includes a mapping relationship between a part fingerprint and an ID. If part fingerprints in the FP mapping table do not duplicate the fingerprints of the second data, the data blocks corresponding to the fingerprints in the second data are non-deduplication data, and the computer device allocates consecutive second IDs and consecutive second physical addresses to the non-deduplication data blocks of the second data.

If the part fingerprints in the FP mapping table duplicate the fingerprints of the second data, the computer device performs duplication check in the ID mapping table based on the fingerprints of the second data. In an example, based on IDs corresponding to duplicated part fingerprints in the FP mapping table, the computer device searches the ID mapping table for complete fingerprints of the IDs, and compares the fingerprints of the second data. If the fingerprints of the second data do not duplicate the complete fingerprints in the ID mapping table, the computer device allocates the consecutive second IDs and the consecutive second physical addresses to the non-deduplication data blocks of the second data. If the fingerprints of the second data duplicate the complete fingerprints in the ID mapping table, the computer device updates the IDs to a LUN mapping table, that is, adds mapping relationships between logical addresses and the IDs to the LUN mapping table.

In an embodiment of this application, the second ID and the second physical address in the foregoing data writing process and the first ID and the first physical addresses in the foregoing embodiment of the data reading process may be same data, or may be different data. This is not limited.

Figure 4:
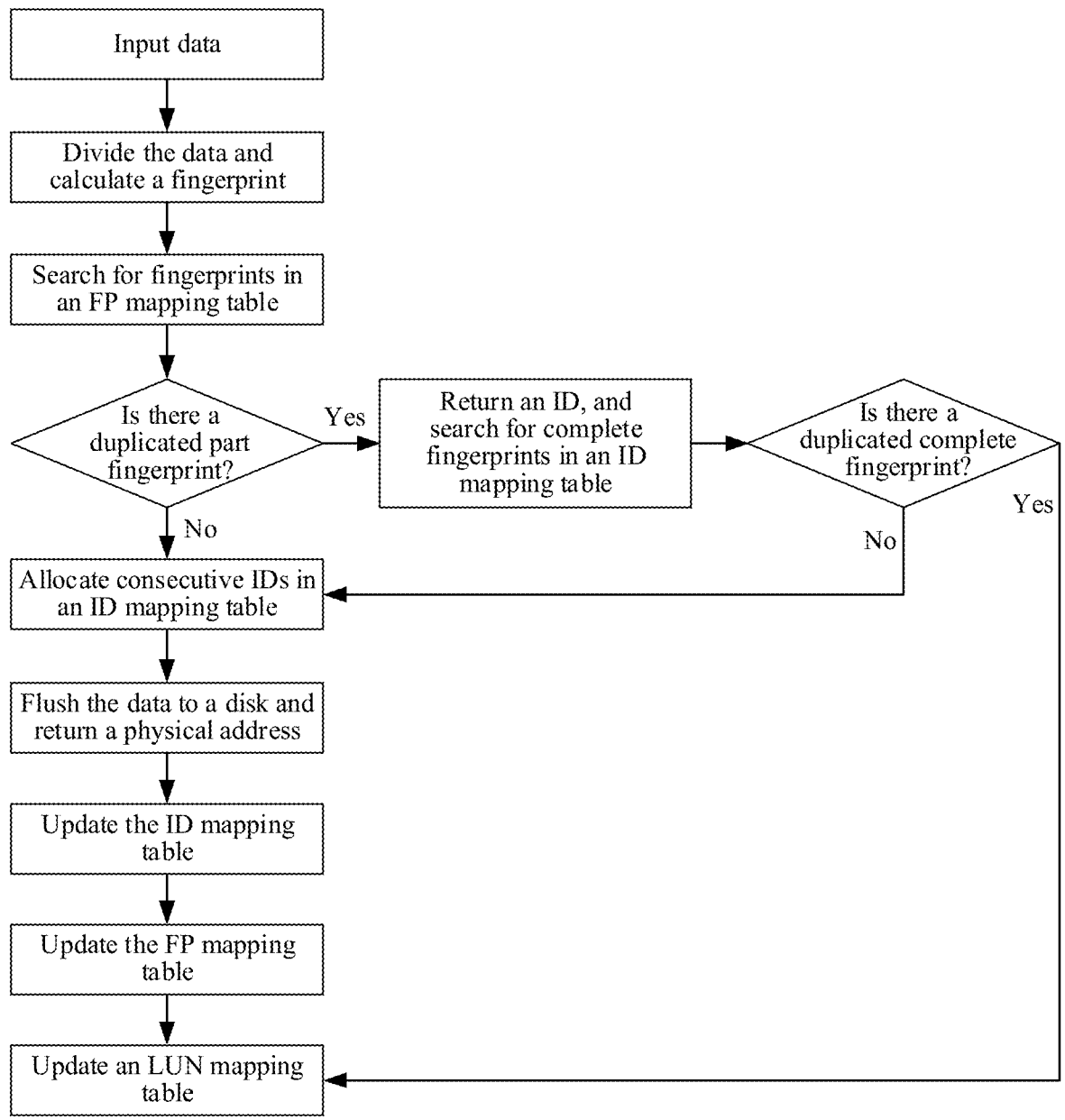
FIG. 4 is a schematic diagram of another data processing method according to an embodiment of this application.

Referring to FIG. 4, a schematic flowchart of a data writing process according to an embodiment of this application is disclosed. The following describes a data writing process in an embodiment of this application with reference to an example shown in FIG. 4. As shown in FIG. 4, a computer device receives a to-be-stored data stream. After receiving the data stream, the computer device divides the data stream into data blocks and calculates a fingerprint of each block. The computer device searches an FP mapping table for the fingerprint of each block. If a part fingerprint in the FP mapping table does not duplicate the fingerprint, the computer device allocates an ID and a physical address to the data block corresponding to the fingerprint.

If a part fingerprint in the FP mapping table duplicates the fingerprint, the computer device returns an ID corresponding to the part fingerprint, and searches an ID mapping table for a complete fingerprint corresponding to the ID. If the complete fingerprint does not duplicate the fingerprint, the computer device allocates an ID and a physical address to the data block corresponding to the fingerprint. If the complete fingerprint duplicates the fingerprint, the computer device adds, to a LUN mapping table, a mapping from the logical address to the ID.

In an embodiment of this application, IDs and physical addresses allocated to data in a same batch are consecutive, records of the allocated IDs in the ID mapping table are also consecutive, and continuity of the IDs during ID allocation is ensured by an ID block division module. In an embodiment of this application, some IDs are reserved in ID segments for data of different attributes in the ID mapping table, so that IDs allocated for data that is of a same attribute and that is input discontinuously are consecutive.

In an embodiment of this application, when performing ID allocation, the computer device performs ID allocation based on attribute information of a non-deduplication data block. The computer device separately reserves some ID spaces for data of different attributes. When performing ID allocation, the computer device checks whether an ID space is allocated to an attribute of data on which allocation is to be performed. If an ID space is allocated and there are sufficient IDs in the ID space for allocation for data in a current batch, the computer device directly continues to sequentially allocate the IDs in the ID space. If no ID space is allocated to the attribute of the data on which allocation is to be performed, or the IDs in the ID space are insufficient for allocation for the data in the current batch, the computer device reallocates a segment of ID space. Therefore, in an embodiment of this application, even if data blocks of a same attribute arrive in a plurality of batches, consecutive IDs can also be allocated to non-deduplication data blocks of a same attribute.

In an embodiment of this application, attribute information of written data being the same includes a case in which written data belongs to a same file, or written data is same data that is input as a plurality of input streams obtained through division.

Figure 5:
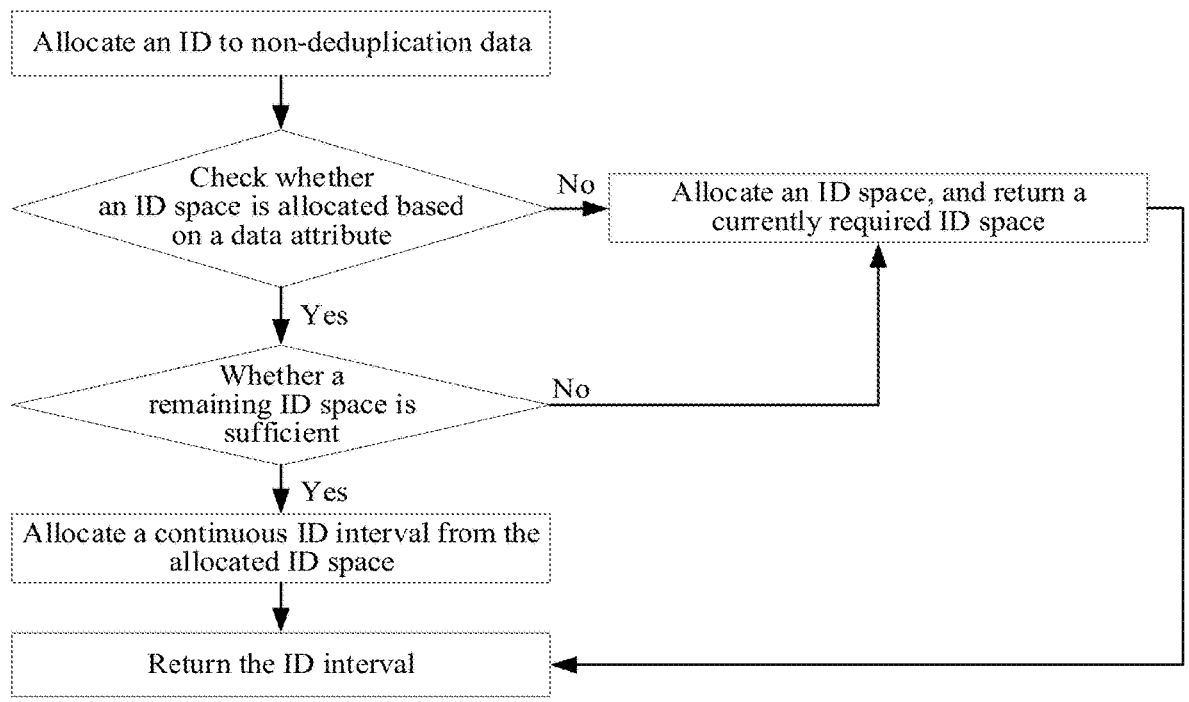
FIG. 5 is a schematic diagram of another data processing method according to an embodiment of this application.

Referring to FIG. 5, a schematic flowchart of ID space allocation according to an embodiment of this application is disclosed. As shown in FIG. 5, when a computer device allocates an ID to a non-deduplication data block, the computer device allocates the ID space based on an attribute of the non-deduplication data block. If an ID space is allocated to the attribute of the non-deduplication data block by the computer device and the ID space is sufficient, the computer device allocates a continuous ID interval from the allocated ID space. If an ID space is not allocated to the attribute of the non-deduplication data block by the computer device, or if an ID space is allocated but the ID space is insufficient, the computer device allocates a segment of ID space, and returns a currently required ID interval.

In an embodiment of this application, after receiving second data and dividing the data, the computer device may extract a part of data blocks according to a sampling policy, where the sampling policy includes sampling data blocks among which sequence intervals are the same, or sampling data blocks among which logical address intervals are the same. The computer device searches an FP mapping table for a fingerprint of an extracted data block. If a fingerprint in the FP mapping table does not duplicate the fingerprint, the computer device marks the sampled data block as a non-deduplication data block. If the fingerprint in the FP mapping table duplicates the fingerprint, the computer device continues to search an ID mapping table based on a returned ID, and loads, to an internal memory, entries that are in the ID mapping table and that are near the ID, to perform entry pre-fetch in the ID mapping table.

In an example, in a process of searching the ID mapping table, the computer device obtains, from the ID mapping table based on the ID near the ID, entries corresponding to a plurality of near IDs, and stores the entries corresponding to the plurality of near IDs in the internal memory, to establish an ID mapping table cache. Subsequently, the computer device may directly obtain a complete fingerprint from the ID mapping table cache based on the ID. In this way, efficiency of duplication check of the computer device is improved.

Figure 6:
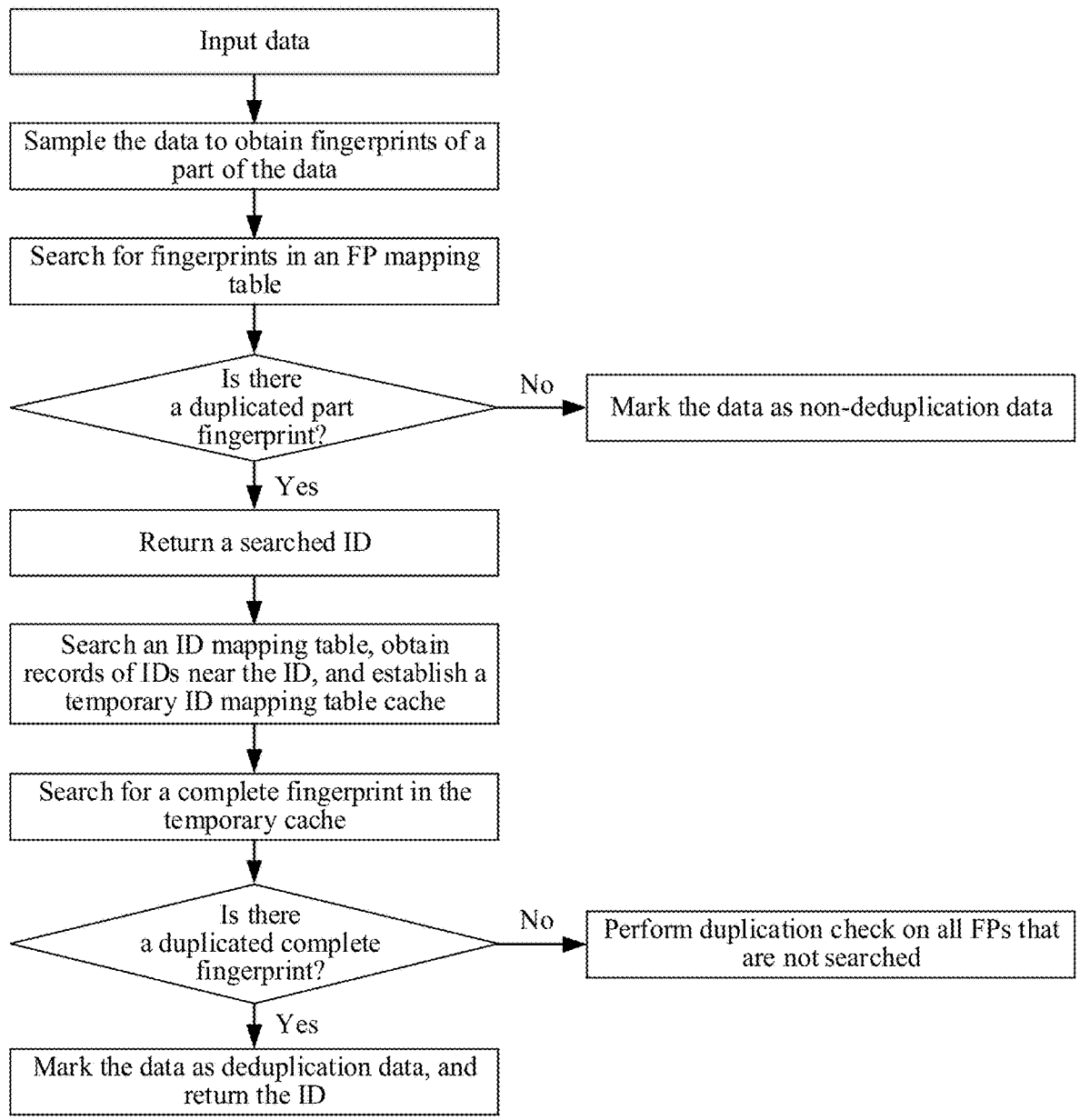
FIG. 6 is a schematic diagram of another data processing method according to an embodiment of this application.

Referring to FIG. 6, a schematic flowchart of duplication check for ID pre-fetch according to an embodiment of this application is disclosed. As shown in FIG. 6, after calculating fingerprints of data in a batch, a computer device samples the data to obtain fingerprints of a part of the data, and searches for part fingerprints in an FP mapping table. If there is no part fingerprint in the FP mapping table duplicating the fingerprint, the computer device marks data corresponding to the fingerprint as non-deduplication data. If a part fingerprint in the FP mapping table duplicates the fingerprint, the computer device returns an ID corresponding to the duplicated fingerprint, and searches the ID mapping table based on the ID. When searching the ID mapping table, the computer device stores, into an internal memory, a plurality of ID entries near the ID in the ID mapping table, and establishes an ID mapping table cache. The computer device searches for a complete fingerprint corresponding to the ID in the ID mapping table cache. If the complete fingerprint duplicates the fingerprint, the computer device marks the data as deduplication data and returns the ID.

It may be understood that, in a process of searching the FP mapping table by the computer device, because the fingerprint duplicates the fingerprint in the FP mapping table when duplication check is performed, while returning the ID corresponding to the fingerprint, the computer device loads, to the internal memory, ID entries that are of a plurality of fingerprints and that are near the ID, to establish an FP mapping table cache. Subsequently, when searching the FP mapping table, the computer device first searches the FP mapping table cache, and then searches a disk medium if the fingerprint is not found.

303. The computer device stores the second data in the second physical addresses.

After the computer device allocates the consecutive physical addresses of the consecutive IDs to the second data, the computer device stores the second data in the second physical addresses. In an example, when the computer device determines that the fingerprint of the data block in the second data is not duplicated, the computer device allocates an ID and a physical address to the data block, and stores the data block in the physical address.

304: The computer device updates the ID mapping table, the FP mapping table, and the LUN mapping table.

After the computer device stores the second data in the physical addresses, the computer device updates the ID mapping table, the FP mapping table, and the LUN mapping table. In an example, after the computer device stores the data blocks in the second data into the corresponding physical addresses, the computer device sequentially adds mappings between IDs of the data blocks, complete fingerprints of the data blocks, and the physical addresses of the data blocks to the ID mapping table. The computer device adds mapping relationships between part fingerprints of the data blocks and the IDs of the data blocks to the FP mapping table. The computer device adds mapping relationships between logical addresses of the data blocks and the IDs of the data blocks to the LUN mapping table.

In an embodiment of this application, after the computer device updates the ID mapping table, the FP mapping table, and the LUN mapping table, non-deduplication data in the second data is successfully written. When the computer device updates the ID mapping table, a storage structure of the ID mapping table may be a B-tree, a B+ tree, or any other storage structure based on an ID sort. In this way, storage locations of consecutive IDs in the ID mapping table are also consecutive. In an embodiment of this application, a sequence in which the computer device updates the ID mapping table, the FP mapping table, and the LUN mapping table is not limited.

In an embodiment of this application, after overwriting occurs on the computer device, if an ID in the LUN mapping table is overwritten, an entry of the ID in the ID mapping table is actually invalid, and the computer device recycles the entry in the ID mapping table. In an example, the computer device scans the LUN mapping table periodically or a user triggers scanning. The computer device scans the LUN mapping table and obtains IDs in the LUN mapping table. Then the computer device scans the ID mapping table, and deletes an entry with an ID that exists only in the ID mapping table but does not exist in the LUN mapping table.

Figure 7:
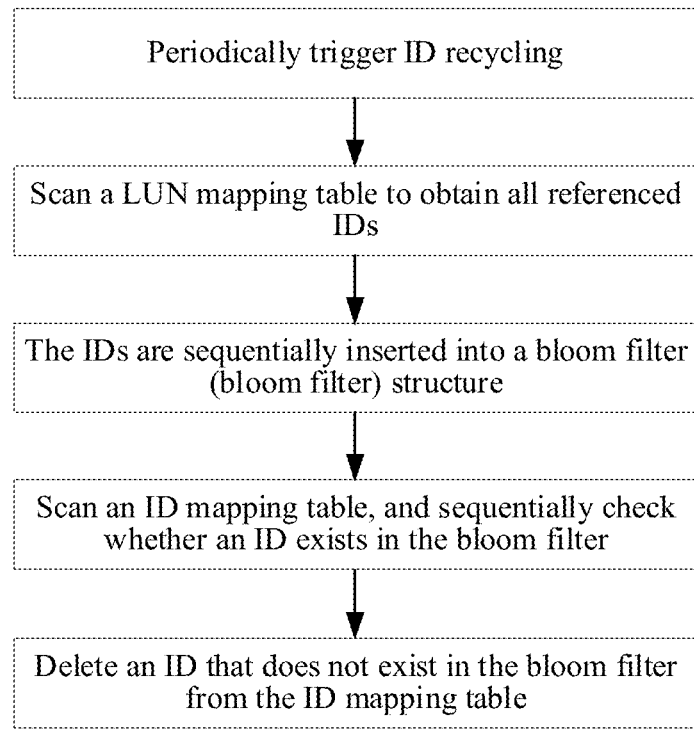
FIG. 7 is a schematic diagram of another data processing method according to an embodiment of this application.

Referring to FIG. 7, a schematic flowchart of ID recycling according to an embodiment of this application is disclosed. As shown in FIG. 7, a computer device periodically triggers ID recycling. In ID recycling, the computer device scans a LUN mapping table to obtain all IDs that have a mapping relationship, and the computer device sequentially inserts the IDs into a bloom filter structure. The computer device scans an ID mapping table, and sequentially checks whether an ID in the ID mapping table exists in the bloom filter. The computer device deletes, from the ID mapping table, an ID entry corresponding to an ID that does not exist in the bloom filter.

Figure 8:
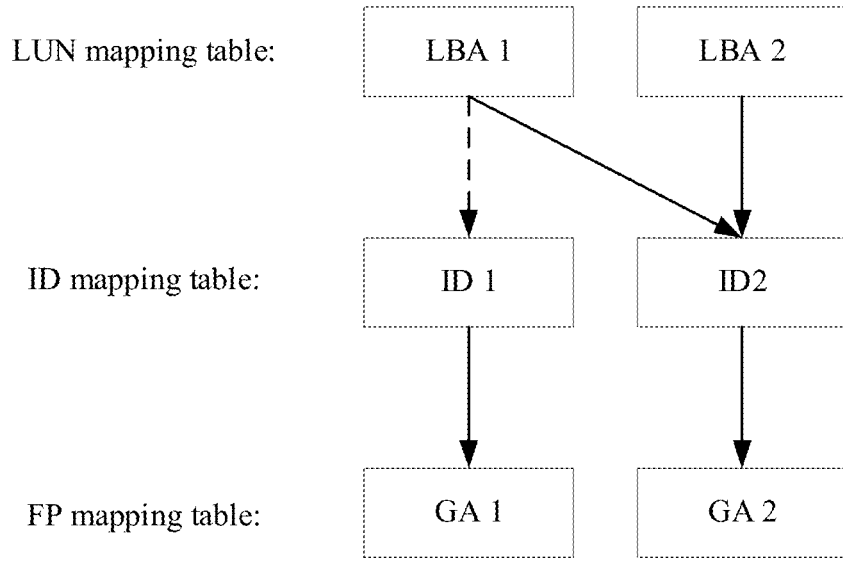
FIG. 8 is a schematic diagram of another data processing method according to an embodiment of this application.

Referring to FIG. 8, a schematic flowchart of an overwriting scenario according to an embodiment of this application is disclosed. In an example shown in FIG. 8, after overwriting occurs on a computer device, a logical address originally pointing at an ID 1 in a LUN mapping table points at an ID 2. It is assumed that the ID 1 does not have deduplication data, in other words, the ID 1 is not duplicated in the LUN mapping table. The ID 1 exists in the LUN mapping table after overwriting. An entry of the ID 1 in an ID mapping table is actually invalid, but the ID 1 in the ID mapping table is not recycled. This results in storage space waste in the ID mapping table. A disk space occupied by data in a physical address at which the ID 1 pointed cannot be recycled.

In an embodiment of this application, the computer device deletes an ID entry that exists in the ID mapping table but does not exist in the LUN mapping table, to improve space utilization of the ID mapping table.

The foregoing describes the data processing methods provided in embodiments of this application. The following describes related apparatus in embodiments of this application with reference to accompanying drawings.

Figure 9:
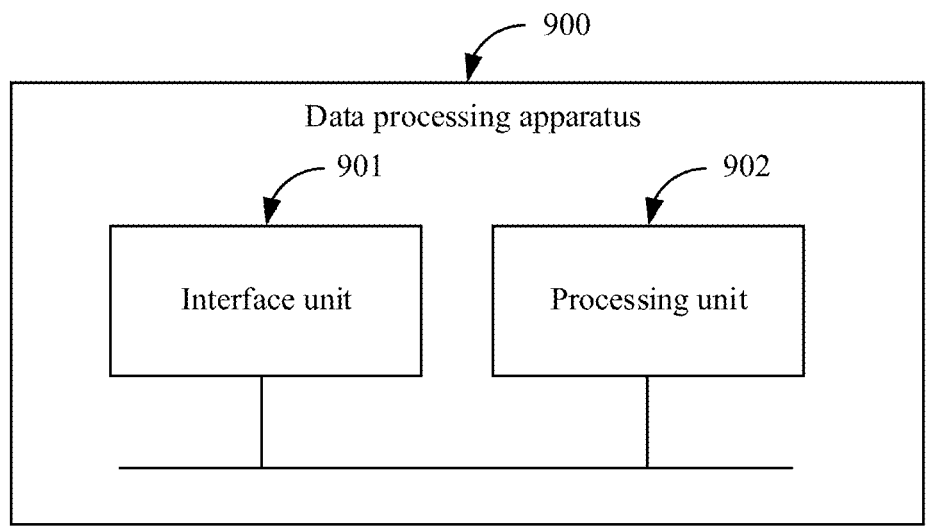
FIG. 9 is a schematic diagram of a structure of a computer device according to an embodiment of this application.

Referring to FIG. 9, a schematic diagram of a structure of a data processing apparatus according to an embodiment of this application is disclosed. The data processing apparatus is configured to implement steps corresponding to the computer device in the foregoing embodiments. As shown in FIG. 9, a data processing apparatus 900 includes an interface unit 901 and a processing unit 902.

The processing unit 902 is configured to obtain a first identifier ID sequence from a logical unit number LUN mapping table based on logical addresses of first data, where IDs in the first ID sequence are allocated based on a sequence of physical addresses, the first data is a plurality of pieces of data with consecutive IDs, and the LUN mapping table includes mapping relationships between the logical addresses and the IDs. When the IDs in the first ID sequence are consecutive, the processing unit 902 is further configured to obtain first physical addresses from an ID mapping table based on one ID in the first ID sequence, where the ID mapping table includes a mapping relationship between an ID and a physical address, and the first physical addresses are a plurality of physical addresses corresponding to the first ID sequence. The processing unit 902 is further configured to read the first data based on the first physical addresses.

In a possible implementation, the interface unit 901 is configured to receive second data, where the second data is data to be stored in batches by a computer device. When fingerprints of the second data do not duplicate fingerprints in the FP mapping table, the processing unit 902 is further configured to allocate consecutive second IDs and consecutive second physical addresses to the second data, where the FP mapping table includes a mapping relationship between a fingerprint and an ID.

In a possible implementation, the processing unit 902 is further configured to, when the fingerprints of the second data duplicate the fingerprints in the FP mapping table, and the fingerprints of the second data do not duplicate fingerprints in the ID mapping table, allocate the second IDs and the second physical addresses to the second data.

In a possible implementation, the fingerprint in the FP mapping table is a part fingerprint of a complete fingerprint, and the fingerprint in the ID mapping table is a complete fingerprint.

In a possible implementation, the processing unit 902 is further configured to store the second data in the second physical addresses, add mapping relationships between the second IDs, the fingerprints of the second data, and the second physical addresses to the ID mapping table, and add mapping relationships between part fingerprints of the second data and the second IDs to the FP mapping table.

In a possible implementation, the processing unit 902 is further configured to, when the part fingerprint of the second data duplicates the fingerprint in the FP mapping table, load, to an internal memory, entries corresponding to a plurality of IDs near an ID corresponding to the duplicated fingerprint in the FP mapping table.

In a possible implementation, some IDs are reserved in ID segments for data of different attributes in the ID mapping table, so that IDs allocated for data that is of a same attribute and that is input discontinuously are consecutive.

In a possible implementation, the processing unit 902 is further configured to, when an ID in the LUN mapping table is overwritten, delete the ID that does not exist in the LUN mapping table from the ID mapping table.

It should be understood that unit division in the apparatus is merely logical function division. In an actual implementation, all or some of the units may be integrated into one physical entity or may be physically separated. In addition, all the units in the apparatus may be implemented in a form in which a processing element invokes software, or may be implemented in a form of hardware; or some units may be implemented in a form in which a processing element invokes software, and some units are implemented in a form of hardware. For example, each unit may be a separately disposed processing element, or may be integrated into a chip of the apparatus for implementation. In addition, each unit may alternatively be stored in a memory in a form of a program to be invoked by a processing element of the apparatus to perform a function of the unit. In addition, all or some of the units may be integrated, or may be implemented independently. The processing element herein may also be referred to as a processor, and may be an integrated circuit having a signal processing capability. During implementation, steps in the foregoing methods or the foregoing units may be implemented by using a hardware integrated logic circuit in a processor element, or may be implemented in the form of software invoked by the processing element.

In an example, the unit in any one of the foregoing apparatuses may be one or more integrated circuits configured to implement the foregoing method, for example, one or more application-specific integrated circuits (ASICs), one or more microprocessors such as digital signal processors (DSP), one or more field-programmable gate arrays (FPGAs), or a combination of at least two of these integrated circuit forms. For another example, when the units in the apparatus may be implemented in a form of scheduling a program by the processing element, the processing element may be a general-purpose processor, for example, a central processing unit (CPU) or another processor that can invoke the program. For still another example, the units may be integrated and implemented in a form of a system-on-a-chip (SOC).

Figure 10:
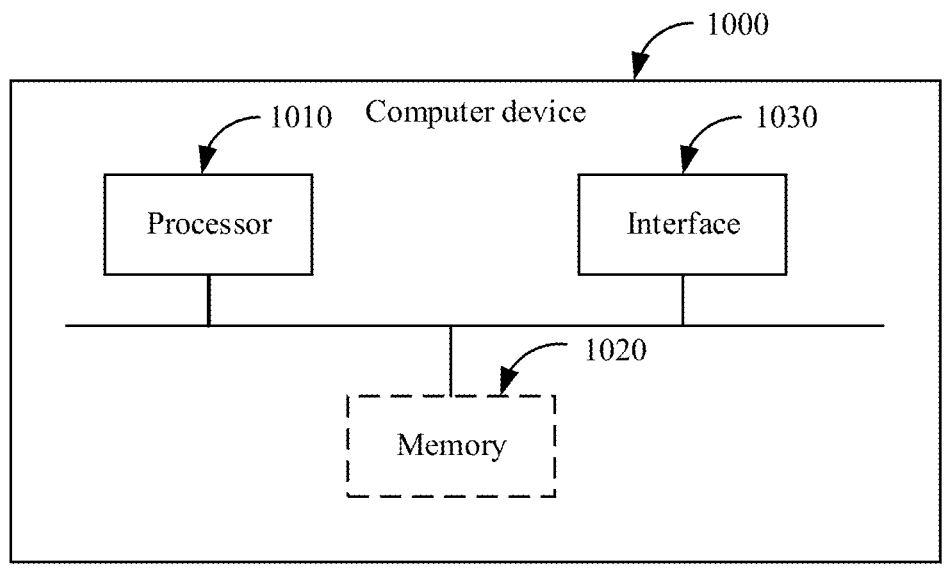
FIG. 10 is a schematic diagram of a structure of another computer device according to an embodiment of this application.

Referring to FIG. 10, a schematic diagram of a computer device according to an embodiment of this application is disclosed. The computer device is configured to implement operations of the computer device in the foregoing embodiments. As shown in FIG. 10, the computer device includes a processor 1010 and an interface 1030. The processor 1010 is coupled to the interface 1030. The interface 1030 is configured to communicate with another device. The interface 1030 may be a transceiver or an input/output interface. The interface 1030 may be, for example, an interface circuit. Optionally, the computer device further includes a memory 1020, configured to store instructions executed by the processor 1010, or store input data required by the processor 1010 to run the instructions, or store data generated after the processor 1010 runs the instructions.

The methods implemented by the computer device in the foregoing embodiments may be implemented by the processor 1010 by invoking a program stored in a memory (which may be the memory 1020 in the computer device, or may be an external memory). In an example, the computer device may include the processor 1010. The processor 1010 invokes the program in the memory to implement the methods implemented by the computer device in the foregoing method embodiments. The processor herein may be an integrated circuit having a signal processing capability, for example, a CPU. The computer device may be implemented by configuring one or more integrated circuits that implement the foregoing methods, for example, one or more ASICs, one or more microprocessors DSPs, one or more FPGAs, or a combination of at least two of the integrated circuit forms. Alternatively, the foregoing implementations may be combined.

In an example, functions/implementation processes of the interface unit 901 and the processing unit 902 in FIG. 9 may be implemented by the processor 1010 in the computer device 1000 shown in FIG. 10 by invoking the computer-executable instructions stored in the memory 1020.

According to another embodiment of this application, a computer-readable storage medium is further provided. The computer-readable storage medium stores computer-executable instructions. When a processor of a device executes the computer-executable instructions, the device performs the method performed by the computer device in the foregoing method embodiments.

In another embodiment of this application, a computer program product is further provided. The computer program product includes computer-executable instructions, and the computer-executable instructions are stored in a computer-readable storage medium. When a processor of a device executes the computer-executable instructions, the device performs the method performed by the computer device in the foregoing method embodiments.

It may be clearly understood by a person skilled in the art that, for the purpose of convenient and brief description, for detailed working processes of the foregoing system, apparatus, and unit, refer to corresponding processes in the foregoing method embodiments. Details are not described herein again.

In the several embodiments provided in this application, it should be understood that the disclosed system, apparatus, and method may be implemented in other manners. For example, the described apparatus embodiment is merely an example. For example, the described unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium and includes several instructions for instructing a computer device (which may be a personal computer, a server, or a network device) to perform all or some of the steps of the methods described in embodiments of this application. The foregoing storage medium includes any medium that can store program code, for example, a Universal Serial Bus (USB) flash drive, a removable hard disk, a read-only memory (ROM), a random-access memory (RAM), a magnetic disk, or an optical disc.

What is claimed is:

1. A method, comprising:
obtaining a first identifier (ID) sequence comprising first IDs from a logical unit number (LUN) mapping table based on logical addresses of first data, wherein the first IDs are allocated based on a sequence of physical addresses, and wherein the LUN mapping table comprises mapping relationships between the logical addresses and the first IDs;
obtaining first physical addresses from an ID mapping table based on one ID in the first ID sequence when the first IDs are consecutive, wherein the ID mapping table comprises a mapping relationship between the first IDs and the first physical addresses, and wherein the first physical addresses correspond to the first ID sequence; and
reading the first data based on the first physical addresses.

2. The method of claim 1, further comprising:
receiving second data that is to be stored in batches; and
allocating second IDs to the second data and second physical addresses of the sequence of physical addresses to the second data when first fingerprints of the second data do not duplicate second fingerprints in a fingerprint (FP) mapping table, wherein the second IDs are consecutive, wherein the second physical addresses are consecutive, and wherein the FP mapping table comprises a mapping relationship between each fingerprint of the second fingerprints and the first IDs.

3. The method of claim 2, further comprising allocating the second IDs and the second physical addresses to the second data when the first fingerprints duplicate the second fingerprints, and the first fingerprints do not duplicate third fingerprints in the ID mapping table.

4. The method of claim 2, wherein the second fingerprints are a part of a complete fingerprint, and wherein third fingerprints in the ID mapping table are complete fingerprints.

5. The method of claim 2, wherein after allocating the second IDs and the second physical addresses to the second data, the data processing method further comprises:
storing the second data in the second physical addresses;
adding first mapping relationships between the second IDs, the first fingerprints, and the second physical addresses to the ID mapping table; and
adding second mapping relationships between part of the first fingerprints and the second IDs to the FP mapping table.

6. The method of claim 2, further comprising:
performing a duplication check in the FP mapping table based on a part of the first fingerprints; and
loading, to an internal memory, entries corresponding to a plurality of third IDs near a second ID corresponding to a duplicated fingerprint when duplicating a third fingerprint of the second fingerprints in the FP mapping table to obtain the duplicated fingerprint.

7. The method of claim 1, further comprising reserving one or more of the first IDs in ID segments for data of different attributes in the ID mapping table, wherein the one or more of the first IDs that comprises a same attribute and that is input discontinuously are consecutive.

8. The method of claim 1, further comprising deleting at least one of the first IDs that does not exist in the LUN mapping table from the ID mapping table when at least one of the first IDs in the LUN mapping table is overwritten.

9. A computer device, comprising:
a memory configured to store instructions; and
a processor coupled to the memory and configured to execute the instructions, that when executed by the processor, cause the computer device to:
obtain a first identifier (ID) sequence comprising first IDs from a logical unit number (LUN) mapping table based on logical addresses of first data, wherein the first IDs are allocated based on a sequence of physical addresses, and wherein the LUN mapping table comprises mapping relationships between the logical addresses and the first IDs;
obtain first physical addresses from an ID mapping table based on one ID in the first ID sequence when the first IDs are consecutive, wherein the ID mapping table comprises a mapping relationship between the first IDs and the first physical addresses, and wherein the first physical addresses correspond to the first ID sequence; and
read the first data based on the first physical addresses.

10. The computer device of claim 9, wherein the instructions that when executed by the processor further cause the computer device to:
receive second data that is to be stored in batches; and
allocate second IDs to the second data and second physical addresses of the sequence of physical addresses to the second data when first fingerprints of the second data are not duplicate second fingerprints in a fingerprint (FP) mapping table, wherein the second data comprises the first fingerprints, wherein the FP mapping table comprises the second fingerprints, and wherein the FP mapping table comprises a mapping relationship between each fingerprint of the second fingerprints and the first IDs.

11. The computer device of claim 10, wherein the instructions that when executed by the processor further cause the computer device to allocate the second IDs and the second physical addresses to the second data when the first fingerprints duplicate the second fingerprints, and the first fingerprints do not duplicate third fingerprints in the ID mapping table.

12. The computer device of claim 10, wherein the second fingerprints are a part of a complete fingerprint, and wherein third fingerprints in the ID mapping table are complete fingerprints.

13. The computer device of claim 10, wherein after allocating the second IDs and the second physical addresses to the second data, the instructions that when executed by the processor further cause the computer device to:
store the second data in the second physical addresses;
add first mapping relationships between the second IDs, the first fingerprints, and the second physical addresses to the ID mapping table; and
add mapping relationships between part of the first fingerprints and the second IDs to the FP mapping table.

14. The computer device of claim 10, wherein the instructions that when executed by the processor further cause the computer device to:
perform a duplication check in the FP mapping table based on a part of the first fingerprints; and
load, to an internal memory, entries corresponding to a plurality of third IDs near a second ID corresponding to a duplicated fingerprint when duplicating a third fingerprint of the second fingerprints in the FP mapping table to obtain the duplicated fingerprint.

15. The computer device of claim 9, wherein the instructions that when executed by the processor further cause the computer device to reserve one or more of the first IDs in ID segments for data of different attributes in the ID mapping table, wherein the one or more of the first IDs that comprises a same attribute and that is input discontinuously are consecutive.

16. The computer device of claim 9, wherein the instructions that when executed by the processor further cause the computer device to delete at least one of the first IDs that does not exist in the LUN mapping table from the ID mapping table when at least one of the first IDs in the LUN mapping table is overwritten.

17. A computer program product comprising computer-executable instructions that are stored on a that are stored on a non-transitory computer-readable storage medium and that, when executed by a processor cause a computer device to:
obtain a first identifier (ID) sequence comprising first IDs from a logical unit number (LUN) mapping table based on logical addresses of first data, wherein IDs in the first IDs are allocated based on a sequence of physical addresses, and wherein the LUN mapping table comprises mapping relationships between the logical addresses and the first IDs;
obtain first physical addresses from an ID mapping table based on one ID in the first ID sequence when the first IDs are consecutive, wherein the ID mapping table comprises a mapping relationship between the first IDs and the first physical addresses, and wherein the first physical addresses correspond to the first ID sequence; and
read the first data based on the first physical addresses.

18. The computer program product of claim 17, wherein the computer-executable instructions that when executed by the processor cause the computer device to:
receive second data that is to be stored in batches; and
allocate second IDs to the second data and second physical addresses of the sequence of physical addresses to the second data when first fingerprints of the second data are not duplicate second fingerprints in a fingerprint (FP) mapping table, wherein the second data comprises the first fingerprints, wherein the FP mapping table comprises the second fingerprints, and wherein the FP mapping table comprises a mapping relationship between each fingerprint of the second fingerprints and the first IDs.

19. The computer program product of claim 18, wherein the computer-executable instructions that when executed by the processor cause the computer device to allocate the second IDs and the second physical addresses to the second data when the first fingerprints duplicate the second fingerprints, and the first fingerprints do not duplicate third fingerprints in the ID mapping table.

20. The computer program product of claim 18, wherein the second fingerprints are a part of a complete fingerprint, and wherein third fingerprints in the ID mapping table are complete fingerprints.

* * * * *